Aug. 25, 1953  E. G. BRUCE  2,650,108
SUSPENSION FOR AUTOMOBILES AND OTHER VEHICLES
Filed April 28, 1947  2 Sheets-Sheet 1

INVENTOR
ERNEST G. BRUCE, DECEASED,
BY THE PENNSYLVANIA COMPANY
FOR BANKING AND TRUSTS OF
PHILADELPHIA, PA, ADMINISTRATOR

BY Francis D. Ammen
ATTORNEY

Aug. 25, 1953 E. G. BRUCE 2,650,108
SUSPENSION FOR AUTOMOBILES AND OTHER VEHICLES
Filed April 28, 1947 2 Sheets-Sheet 2
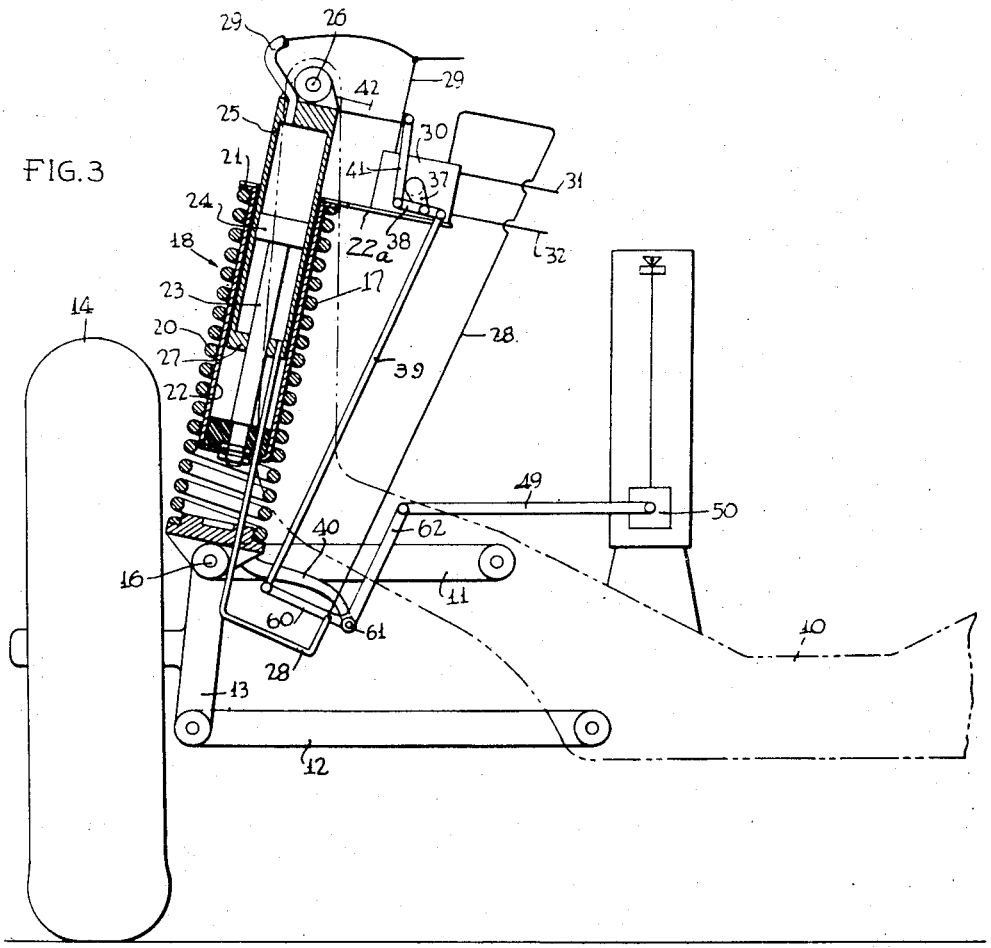
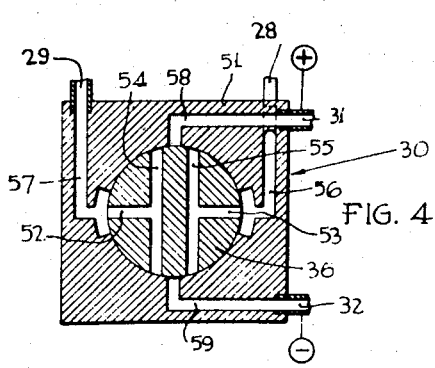
INVENTOR
ERNEST G. BRUCE, DECEASED,
BY THE PENNSYLVANIA COMPANY
FOR BANKING AND TRUSTS OF
PHILADELPHIA, PA., ADMINISTRATOR
BY Frances L. Ammen
ATTORNEY Patented Aug. 25, 1953

2,650,108

UNITED STATES PATENT OFFICE 2,650,108

SUSPENSION FOR AUTOMOBILES AND
OTHER VEHICLES

Ernest G. Bruce, deceased, late of Philadelphia,
Pa., by The Pennsylvania Company for Banking and Trusts, Philadelphia, Pa., administrator Application April 28, 1947, Serial No. 744,416

10 Claims. (Cl. 280—124)

The invention relates to a suspension for vehicles and, more particularly, to a suspension for land vehicles, such as automobiles.

Among the objects of the invention is a vehicle suspension which will transmit a minimum effect of the irregularities of the road to the supported body, that is, a suspension which gives a substantially smoother ride than ordinary spring suspensions do.

Another object of the invention is to provide a suspension which combines with the achievement of the aforesaid object such a support of the body that the latter, in turning curves, will be less affected by the centrifugal force, and will sway outwardly less than is the case with ordinary suspensions. In fact if desired the invention may substantially eliminate such tilting, and could actually cause the body to tilt inwardly toward the center of the curve about which the vehicle is turning.

An outstanding feature of the invention by which the aforesaid objects are achieved consists in a spring suspension having interposed in series between the wheels and the supported body a spring and a power operated reciprocable or extensible connection or strut member together with means for controlling the latter so that ordinarily when the spring is compressed or extended due to road irregularities, said connection moves or is extended in the opposite sense so as to act as a compensator operating to bring the compression of the spring almost instantaneously back to normal, that is to say, substantially absorbing the effect of the irregularity, and preventing the transmission of the road irregularity through the spring to the body.

The second object of the invention is achieved mainly by using the first-named arrangement in combination with a second controlling means so that when the car turns a curve at sufficient speed to develop a substantial centrifugal force acting on its body, said extensible or reciprocable strut member is shortened on the inside and lengthened on the outside of the curve without regard to the compression and extension of the springs due to the centrifugal action exerted upon the supported body.

The invention, as well as all its objects and advantages, will be more easily and fully understood from the embodiments illustrated in the attached drawing and described hereinafter.

In the drawing:

Figure 3 is an elevation partly in section corresponding to Figure 2 but illustrating a second embodiment; and Figure 4 is a diagrammatic section through one of the valves for controlling the power operated element.

Figure 1:
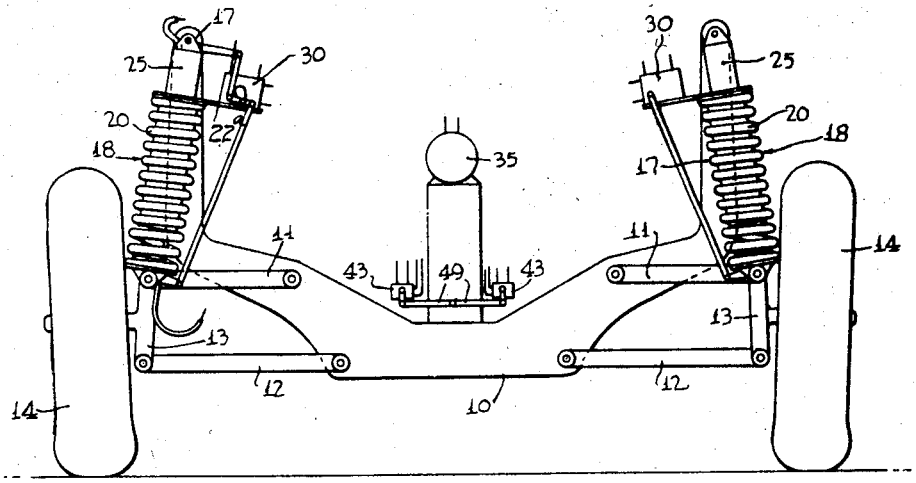
Figure 1 is a diagrammatic front elevation of one form of the spring suspension according to the invention, certain connections and pipe lines being omitted for clarity's sake and because they are more fully illustrated in subsequent figures.

In the accompanying drawing the invention is illustrated as applied to a vehicle having a transverse chassis member 10 to which are pivoted on each side a pair of arms 11 and 12 having their outer ends interconnected by a knuckle member 13 supporting one of the road wheels 14. The pairs of arms 11 and 12 and the knuckle 13 constitute a parallel movement means enabling the wheels to move up and down relatively to the chassis by a movement of translation, that is, without rotating about a fore-and-aft axis.

If the wheels are steering wheels the axis of each king-pin for the same would conform substantially to an inclination corresponding to the dotted line 15.

Interposed between the journal 16 connecting arm 11 and member 13 and an upward extension 17 of the chassis member 10 is a structure 18 which comprehends the outstanding features of the invention.

The structure 18 has a lower spring support 19 journalled at 16 to 11 and 13, a coil spring 20 supported on 19 and pressing against a flange 21 of the cylindrical member 22 surrounded by the spring, a piston rod 23 secured at its lower end to the bottom member 22 and carrying at its upper end a piston 24, and cylinder 25 in which the piston 24 is reciprocable and which has its upper end journalled at 26 to the chassis frame extension 17. The piston rod extends fluid-tightly through the end wall 27 of the cylinder and the interior of the cylinder on both sides of the piston 24 is connected to pressure fluid conduits 28, 29, respectively, which are flexible at least in part. The flange 21 seats against the under side of a flexible arm 22a secured to the under side of the casing of a control valve 30 presently to be described.

The member 22 carries a four-way valve 30 which is connected to the aforesaid conduits 28, 29 and to two further conduits 31, 32 which lead, respectively, to the pressure line 33 and the return line 34 of a pressure driven fluid generator 35. There is no need to illustrate or describe this generator because it may be of any appropriate well known type. It should be noted, however, that the capacity of this generator has to be sufficient for carrying out, with appropriate speed, the tasks outlined hereinafter.

The valve closure such as rotatable plug 36 of valve 30 has an operating lever 37 which is journalled to a mid-point of a double arm lever 38. One arm of the lever 38 is connected by link 39 to a bracket 40 of the lower spring support 19. The other end of lever 38 is journalled by link 41 to another bracket 42 attached to the upper end of the cylinder 25.

A second valve 43 of a construction similar to that of valve 30 is coordinated to each wheel support. This valve makes connection with pipe lines 28 and 29 through conduits 44 and 45, respectively, and with the generator mains 33, 34 by the conduits 46 and 47, respectively. Valve 43 is operated by a lever-and-link system 48, 49 attached to a pendulum 50.

Before describing the operation of the suspension and thereby explaining the purpose of the arrangement so far disclosed, it will be helpful to describe, briefly, the construction of the valve 30, one embodiment of which is diagrammatically illustrated in Figure 4. The valves 43 may be of identical construction and, consequently, need not be described.

The valve body 51 carries rotatably and fluid-tightly the plug 36. This plug is traversed by two T-shaped conduits each having a stem 52, 53 and a cross bar 54, 55 respectively. The pipes 28 and 29 are, by means of conduits 56, 57, permanently in communication with the plug conduits 52, 54 and 53, 55, that is, for such angular movements of the plug within the limits in which the device operates.

The pipes 31 and 32 have connection by conduits 58, 59 with the chamber housing the plug 36. Normally, they are closed by the plug 36 but will communicate with the cross conduit 53 or 55, respectively, upon rotation of the plug in one direction or the other and they will thereby make connection between the lines 31 and 32 of the generator and the pipes 28, 29 leading to the interior of the cylinder 25 on top and below the piston 24 respectively.

The operation of the device is as follows:

When one of the wheels 14 hits, for instance, an obstacle on the road, it will be lifted and thereby compress the spring 20. Simultaneously the link 39 is lifted, thereby turning, in Figure 2, the valve plug counterclockwise by means of arm 37 and lever 38, the latter having the connection between its other end and link 41 as momentary center of rotation. The rotation of the plug establishes communication between the pressure line 31 and the pipe 28 leading to the underside of the piston 24 and communication between the return conduit 32 and the pipe 29 with the effect that pressure medium will be withdrawn from the upper side of the cylinder and simultaneously pressure fluid admitted to the underside of the piston so that the length of the motor structure 22, 23, 24 and 25 is shortened, thereby keeping the spring close to its normal length.

It will be understood from the functioning of the device so far described that the upper support 21 for the spring, rather than transmitting spring pressure to the body or chassis as is the case with ordinary spring suspensions, substantially eliminates the lifting effect of such pressure by moving causing escape of some of the compressed air in the upper end of cylinder 25, which air is the intermediate support for that side of the car body, so that no appreciable change of level of the adjacent side of the car results from the compressing of the coil spring 20.

As soon as the spring has resumed its original length, that is, as soon as the distance between lower spring support 19 and upper spring support 21 is back to normal, the rod 39 will close the valve. On the other hand, the upward movement of the upper spring support 21 with its supporting body 22 and the valve 30 moves the latter closer to the upper end of the cylinder 25 with its bracket 42. The consequence is that the link 42 and the outer end of the lever 38 move downwardly relative to the valve 30 and the lever 38 is swung about its connection to the rod 39 as momentary center of rotation. This in turn has the effect that the valve plug 36 is turned clockwise and now connection is established between the different conduits which will admit pressure fluid to the cylinder 25 on top of the piston 24 and withdraw fluid from the cylinder below the piston. These movements are accomplished during and immediately after the clearance of a road obstacle by the vehicle, so that all parts return to their original positions. Obviously, as soon as this takes place, the valve is again closed because bracket 42 moves upwardly relative to the valve 30 to its original starting position.

If the wheel should go over a hole in the ground instead of a projecting obstacle, the reverse events take place, yet again with the effect that the upper spring support follows the tendency of the spring and keeps it substantially at its predetermined length in maintaining substantially constant pressure between spring support and body or chassis so that the latter will not follow the tendency of the spring.

The linkage 38, 41, 42 has a second purpose, that is, establishing the normal position for any given constant load. If, for instance, the load is increased, the spring is compressed, whereupon rod 39 turns the valve counterclockwise, expanding piston and cylinder as described hereinbefore until link 41 and lever 38 have brought the plug of the valve back to neutral position.

Depending upon the ratio of the lever 38, the chassis and body will be kept on the same level relative to the ground for all loads or they might even be raised slightly with increasing load.

Figure 2:
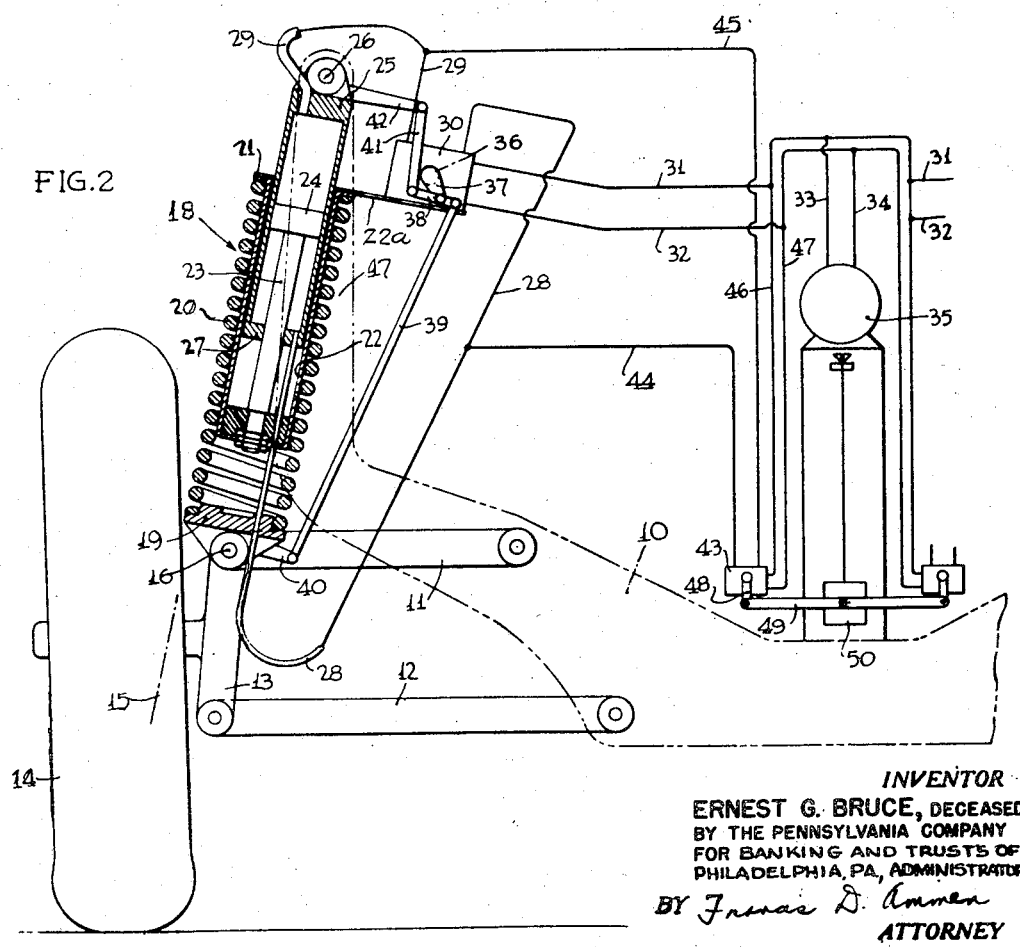
Figure 2 shows the left half of Figure 1 on a larger scale and partly in section with a diagram of the pressure fluid pipe lines.

If, in negotiating a curve, the wheel shown in Figure 2 is on the outside of the curve, then pendulum 50 will swing toward the left and turn lever 48 of the valve clockwise with the effect that pressure fluid is admitted over pipe 44 to the pipe 28 and pipe 29 is connected over pipe 45 with the return inlet of the generator. This will cause an expansion of the structures 22, 25 irrespective of the spring pressure. Increased spring pressure on the outside of the curve will, of course, by means of the lever system and the valve 30, counteract the action controlled by the valve 43. However, both valves 30 and 43 are metering valves and so selected and adjusted that body and chassis are usually lifted on the side located toward the outside of the curve, if the speed of the car is sufficient; whereas on the inside of the curve the reverse procedure is performed, so that the car body will be at least kept approximately horizontal.

The embodiment illustrated in Figure 3 differs from the first embodiment merely in the means for banking the body and chassis in curves. Instead of the hydraulic means employed in the first embodiment, Figure 3 illustrates mechanical means for achieving the same purpose. Insofar as both embodiments are alike, it is not necessary to repeat the description, and for corresponding parts, the same numerals are employed.

The push-pull rod 39 in Figure 3 has its lower end attached to one arm 60 of a bell crank journalled at 61 to the bracket 40 of the lower spring support 19. The other arm 62 of this lever is connected by link 49 to the pendulum 50.

Assuming again that the wheel shown in Figure 3 is on the outside of a curve, pendulum 50 will swing to the left, thereby rotating bell crank lever 60, 62 counterclockwise and, consequently, pulling rod 39 down with the effect that also the plug of the valve 30 is turned clockwise and pressure fluid admitted to the top chamber in the cylinder 25 to cause extension of the spring-and-cylinder unit 18. If, on the other hand, the car is on a straight course, then pendulum 50, link 49 and lever 60, 62 are at rest and the latter will move up and down with the lower spring support 16 without noticeable swinging movement. The outer end of the lever 60 then takes the place of the connection between bracket 40 and rod 39 of the first embodiment, and the action in meeting an obstacle is the same as described for the first embodiment.

It is evident that in accordance with this invention, the upward thrusts of the springs 20 at the sides of the car, do not directly support the car frame, nor the car body, because the compressed air above each piston 24 operates as an air cushion interposed between each spring and the car frame. The pressure of this air on the under side of the head of the cylinder 25, actually supports the car frame.

In the operation of the mechanism of this device as illustrated in Fig. 2, it will also be evident that when the wheel 14 is suddenly lifted by passing over an obstruction in the roadway, the spring seat 19 moves upwardly, and this of course compresses the coil spring 20, which in turn exerts an increased thrust force against the flange 21 of the lower cylinder 22 referred to herein as the bottom member 22. This of course increases the upward thrust force being exerted by the piston rod and its piston 24 which, of course, increases the pressure of the air cushion or other aeriform fluid, in the upper end of cylinder 25 above the piston 24; but the upward movement of the spring seat 19 also causes an upward movement of the link 39 which operates the valve 30 as described, to permit some of the air in the upper end of the cylinder 25 to pass out. The exit of the air compensates for the increase in compression of the spring so that if there is any increase in pressure in the air cushion in the upper end of the cylinder 25, it will be cut down and should be relatively slight.

For this reason a very small amount of the upward thrust given to the wheel and to the spring will actually be imparted to the frame. Letting out this air virtually prevents the spring from lifting the frame. Furthermore, in addition to letting out the air of the air cushion in the cylinder 25 that is supporting the frame on that side, the valve admits additional air into the lower end of the cylinder 25 below the piston 24. This increases the air pressure in the lower end of the cylinder 22 below the head 27, thereby developing increased tensile force in the wall of the cylinder 22 that resists upward thrust at the upper end of the spring, and gives a valuable snubbing effect to the upward movement of the wheel and its attached parts. The result of these co-acting forces controlled as they are through the agency of the compressed air above and below the piston 24, develops a very steady and easy riding effect on the car frame, tending to maintain it in its normal horizontal position regardless of up and down movements of the wheel in passing along the roadway. For it will also be evident that if the wheel 14 suddenly encounters a depression or deep rut in the roadway, the spring 20 will immediately elongate and exert a downward pull on the link 39. This will move the plug of the valve 30 in a clockwise direction and admit an increased quantity of air into the upper end of the cylinder 25, which will thereby increase the pressure on the under side of the head of this cylinder and hold up the frame at this side of the car so as to maintain it substantially in its normal riding position.

The attached claims should be read in full appreciation of such different embodiments and modifications as can be devised by those skilled in the art, especially by those skilled in the art of pressure fluid circuits and controls therefor.

What is claimed is:

1. In a vehicle suspension, an axle for a road wheel, a load supporting structure, means for guiding said axle relative to said structure for reciprocal up and down movement, an extensible and contractible device between said axle and said structure for resiliently transmitting the weight of the structure and the load to the axle, said device comprising in series arrangement in a coil spring and fluid operated motor with reciprocating members, one of the latter of which is connected to the spring and the other to said structure, a valve in a fluid circuit between said motor and a source of fluid pressure for operating said motor, said valve being carried by said member that is connected to said spring, operating linkage between the valve and said axle and said structure for moving the valve to control flow of the operating fluid to and from the motor to cause contraction of said motor upon compression of said spring and extension of said motor upon extension of the spring.

2. An extensible and contractible device adapted for resiliently supporting a supported structure on a supporting structure, comprising in series arrangement: a spring and motor means having relatively reciprocating members one of which is connected to the spring and the other of which is connected to said supported structure, said motor means including two pressure chambers formed between said reciprocating members to receive a driving medium, one of which functions to compensate for a relative movement between said structures in one direction, and the other to compensate for relative movement of said structures in the opposite direction, control means for the driving medium of said motor responsive to compression or extension of said spring, all of said parts co-operating to contract said motor when the supporting structure moves towards the supported structure, and co-operating when the supporting structure moves away from said supported structure to extend said motor, whereby relative movement between said structures is minimized.

3. In a vehicle suspension, a spring, a wheel supporting structure and a load supporting structure, each of said structures provided with attaching means for said spring, at least one of said attaching means comprising a power operated device for changing the distance of the spring attachment from its respective structure, and control means floatingly supported by means connected to the spring at the end provided with the power operated device, said control means being responsive to changes in the load exerted on said spring means by said wheel supporting structure for energizing said device so as to maintain the pressure transmitted by the spring to said load supporting structure at a substantially constant level, said control means comprising a rotary member with a first lever, a double armed second lever journalled between its ends to said first lever and a pair of links attached to the ends of said second lever and respectively to said two structures.

4. In a vehicle suspension, a spring, a wheel supporting structure and a load supporting structure, each of said structures provided with attaching means for said spring means, at least one of said attaching means comprising a power operated device for changing the distance of the spring attachment from its respective structure, and control means floatingly supported by means connected to the spring at the end provided with the power operated device, said control means being responsive to changes in the load exerted on said spring means by said wheel supporting structure for energizing said device so as to maintain the pressure transmitted by the spring to said load supporting structure at substantially constant level, said control means comprising a rotary member with a first lever, a double armed second lever journalled between its ends to said first lever having a shorter arm and a longer arm, a pair of links attached to the ends of said second lever, one of said links connecting said longer arm with the structure provided with the power operated device and the other link connecting the shorter arm with the other structure.

5. In a vehicle suspension, an axle for a road wheel, a load supporting structure, means for guiding said axle relative to said structure for reciprocal up and down movement, an extensible and contractible device between said axle and said structure for resiliently transmitting the weight of the structure and of the load to the axle, said device comprising in series arrangement a spring and a motor with reciprocating members of which latter one is connected to the spring and the other to said structure, governing means for said motor, operating means for said governing means including a bell crank journalled to a member connected for up and down movement with said axle, said crank having a generally horizontal arm operatively connected to said governing means actuating the latter so as to contract said motor upon compression and extend it upon extension of the spring, and a substantially vertical arm operatively connected to a member horizontally movable by centrifugal force so as to turn the crank in the opposite direction in which it moves due to compression or extension of the spring.

6. In a vehicle suspension, an axle for a road wheel, a load supporting structure, means for guiding said axle relative to said structure for reciprocal up and down movement, and an extensible and contractible device between said axle and said structure for resiliently transmitting the weight of the structure and of the load to the axle, said device comprising a spring and a fluid operated motor having two reciprocating members one of which is connected to the spring and the other to said structure, a pair of governing devices disposed in parallel in the supply line of the operating fluid for said motor, means for operating one of said governing devices in response to compression or extension of the spring so as to cause a corresponding movement of the motor members, means for operating the other governing device in response to centrifugal force exerted on the vehicle in passing around curves in the roadway, so as to compensate and develop a counterbalancing effect on said first governing device.

7. In mechanism of the kind described for steadying a wheel-supported car frame, the combination of a car frame, a ground wheel at the side of the frame, a pair of substantially parallel links with a floating knuckle member pivotally attached thereto for connecting the ground wheel to the frame for relative up-and-down movement of the wheel in reacting to an uneven roadway, means including a first part, and a second part telescoping therewith, said second named part attached at its upper end to the car frame, helical spring means co-axial with said telescoping parts for exerting downward pressure on said knuckle member and upward pressure on said first part, a source of fluid under pressure, said telescoping parts having means for maintaining a fluid pressure chamber between the same, means for supplying fluid under pressure to the said chamber from the pressure source for supporting said car frame, and automatic means for releasing a portion of the fluid when the wheel is moved relatively upward by the roadway.

8. Mechanism of the kind described according to claim 7, in which one of said telescoping parts is a cylinder and the other part includes a piston sliding in the cylinder and co-operating with the cylinder to maintain the said fluid chamber between the piston and the head of the cylinder.

9. Mechanism of the kind described according to claim 7, in which one of the said telescoping parts is a cylinder and the other part is a piston running therein so as to form a second pressure chamber for the fluid below the piston; and in which the said automatic means effects the release of fluid from the cylinder above the piston and admits additional fluid to the second chamber, below the piston.

10. In mechanism of the kind described for steadying a wheel-supported car frame, the combination of the car frame, a ground wheel at the side of the frame, parallel movement means for connecting the ground wheel to the car frame for relative up and down movement of the wheel in reacting to an uneven roadway, and imparting a movement of translation to the wheel, a spring for exerting downward pressure on said parallel movement means, a spring-seat pivotally supported on the parallel movement means for supporting said spring at its lower end, means including a part supported on the upper end of said spring, and a part telescoping therewith attached at its upper end to the car frame, said telescoping parts having means for maintaining a fluid pressure chamber between the same, the pressure wherein supports said car frame, a valve having a closure capable of supplying fluid under pressure to the said chamber, and for releasing fluid from said chamber, means connected to the valve-closure actuated by an upward movement of said wheel relative to the car frame to release a portion of the fluid from said chamber, and actuated by a relative downward movement of said wheel to supply fluid under pressure to said chamber.

THE PENNSYLVANIA COMPANY
FOR BANKING AND TRUSTS.
*Administrator of the estate of Ernest G. Bruce, deceased.*
By ROBERT K. McINNES,
*Assistant Trust Officer.*

References Cited in the file of this patent

UNITED STATES PATENTS

| Number | Name | Date |
|---|---|---|
| 2,150,576 | Bell | Mar. 14, 1939 |
| 2,279,120 | Hurley | Apr. 7, 1942 |
| 2,353,503 | Rost | July 11, 1944 |